(12) United States Patent
Shin et al.

(10) Patent No.: US 11,453,737 B2
(45) Date of Patent: Sep. 27, 2022

(54) POLYESTER-POLYCARBONATE COPOLYMER AND METHOD FOR PRODUCING SAME

(71) Applicant: SAMYANG CORPORATION, Seoul (KR)

(72) Inventors: Kyung Moo Shin, Daejeon (KR); Jin Sik Choi, Icheon-si (KR); Young Do Kwon, Daejeon (KR)

(73) Assignee: SAMYANG CORPORATION, Seoul (KR)

( * ) Notice: Subject to any disclaimer, the term of this patent is extended or adjusted under 35 U.S.C. 154(b) by 359 days.

(21) Appl. No.: 16/071,393

(22) PCT Filed: Jan. 19, 2017

(86) PCT No.: PCT/KR2017/000651
§ 371 (c)(1),
(2) Date: Jul. 19, 2018

(87) PCT Pub. No.: WO2017/126901
PCT Pub. Date: Jul. 27, 2017

(65) Prior Publication Data
US 2020/0291162 A1    Sep. 17, 2020

(30) Foreign Application Priority Data
Jan. 20, 2016  (KR) .................... 10-2016-0007194

(51) Int. Cl.
*C08F 293/00* (2006.01)

(52) U.S. Cl.
CPC .................. *C08F 293/00* (2013.01)

(58) Field of Classification Search
CPC ... C08F 293/00; C08G 63/133; C08G 63/193; C08G 63/64; C08G 63/6856; C08G 64/0241; C08G 64/12; C08G 64/1641; C08G 64/18; C08G 64/24; C08L 67/03; C08L 69/00; C08J 5/00
See application file for complete search history.

(56) References Cited

U.S. PATENT DOCUMENTS

| | | | |
|---|---|---|---|
| 4,278,787 A | 7/1981 | Swart et al. | |
| 4,310,652 A | 1/1982 | DeBona et al. | |
| 4,386,196 A | 5/1983 | Wu et al. | |
| 5,344,910 A * | 9/1994 | Sybert .................... | C08G 64/12 528/125 |
| 10,081,708 B2 * | 9/2018 | Shin ..................... | C08G 64/307 |
| 2007/0123686 A1 * | 5/2007 | Mahood ................ | C08G 64/12 528/196 |
| 2007/0123687 A1 * | 5/2007 | Balakrishnan ..... | C08G 63/6856 528/196 |
| 2007/0123688 A1 * | 5/2007 | Mahood ................ | C08G 64/28 528/196 |
| 2008/0161507 A1 * | 7/2008 | Chakravarti ........... | C08L 67/02 525/439 |
| 2009/0030171 A1 * | 1/2009 | Leenders ................ | C08L 69/00 528/196 |
| 2009/0043070 A1 * | 2/2009 | Balakrishnan ..... | C08G 63/6856 528/196 |
| 2010/0286358 A1 * | 11/2010 | Mahood ................. | C08G 63/64 528/201 |
| 2014/0094545 A1 * | 4/2014 | Roncaglia .............. | C08K 5/103 524/91 |

FOREIGN PATENT DOCUMENTS

| | | |
|---|---|---|
| JP | S60228531 A | 11/1985 |
| WO | WO 2007/064574 A1 | 6/2007 |

OTHER PUBLICATIONS

International Search Report for PCT/KR2017/000651 (PCT/ISA/210) dated Apr. 20, 2017.

* cited by examiner

*Primary Examiner* — Frances Tischler
*Assistant Examiner* — Gennadiy Mesh
(74) *Attorney, Agent, or Firm* — Birch, Stewart, Kolasch & Birch, LLP

(57) ABSTRACT

Polycarbonate block copolymers are provided, which have: (A) a polyester block of chemical formula 1; and (B) a polycarbonate block derived from a dihydric phenol of chemical formula 3 compound and phosgene. The copolymers may be prepared by (1) polymerizing ester oligomers to form a compound of chemical formula 1; and (2) copolymerizing the ester oligomer obtained in (1) with a polycarbonate oligomer prepared from a dihydric phenol compound of chemical formula 3 and phosgene, in the presence of a polymerization catalyst. The block copolymer may have a viscosity average molecular weight (Mv) of 10,000 to 200,000. The thermoplastic copolymer resins have excellent heat resistance, transparency, impact strength, and fluidity, and thus can be usefully applied in various products, including office devices, electric/electronic products, and automotive interior/exterior parts;

[Chemical formula 1]

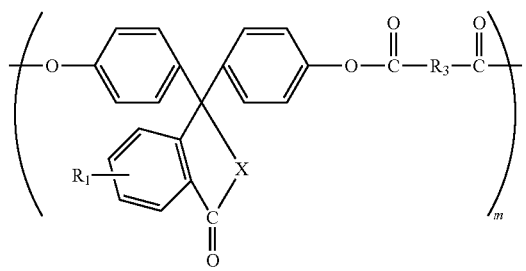

[Chemical formula 3]

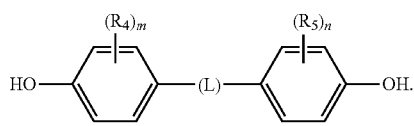

9 Claims, No Drawings

POLYESTER-POLYCARBONATE COPOLYMER AND METHOD FOR PRODUCING SAME

TECHNICAL FIELD

The present invention relates to a thermoplastic copolymer resin having excellent heat resistance and transparency, and a method for preparing the same. More specifically, the present invention relates to a thermoplastic copolymer resin which is obtained by copolymerizing an ester oligomer of a specific structure and a polycarbonate oligomer, and shows remarkably excellent heat resistance and also has good balance of properties such as transparency, impact strength, flowability, etc., and a method for preparing the same and a molded article comprising the same.

BACKGROUND ART

Polycarbonate resin has good heat resistance, mechanical properties (in particular, impact strength) and transparency. Thus, it has been extensively used as electric components, mechanical components and industrial resin. In the electric/electronic fields, in particular, when polycarbonate resin is used for TV housing, computer monitor housing, copier, printer, notebook battery, lithium battery case material, etc., releasing considerable heat, good heat resistance is required as well as mechanical properties.

However, general polycarbonate resins are selectively eroded in a specific solvent and have no resistance thereto. Although they have good anti-creep property to static load, general polycarbonate resins are relatively easily broken when temperature and several environmental conditions are coupled, and have the problem of complicated resistance to dynamic load.

Accordingly, researches to improve heat resistance of polycarbonate resins have been continuously conducted, resulting in development of highly heat-resistant polycarbonate resins (for instance, U.S. Pat. Nos. 5,070,177, 4,918,149, etc.). In general, such highly heat-resistant polycarbonates have increased hydrolyzability and improved heat deformation temperature by modifying bisphenol A to incorporate substituents having stereochemistry at ortho position.

However, conventional highly heat-resistant polycarbonates as such have the problem of seriously poor impact resistance, as compared with general polycarbonate resins.

CONTENTS OF THE INVENTION

Problems to be Solved

The present invention is intended to resolve the above-stated problems of the prior arts, and has an object of providing a thermoplastic polycarbonate copolymer which has remarkably improved heat resistance as compared with conventional highly heat-resistant polycarbonate resins, and also has good balance of properties such as transparency, impact strength, flowability, etc., and a method for preparing the same and a molded article comprising the same.

Technical Means

In order to resolve the above-stated problems, the present invention provides a polycarbonate block copolymer comprising, as repeating units, (A) a polyester block having a structure represented by the following chemical formula 1; and (B) a polycarbonate block:

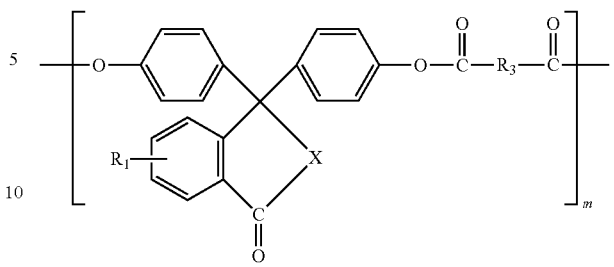

[Chemical formula 1]

In the above chemical formula 1,
$R_1$ independently represents hydrogen atom, alkyl, cycloalkyl, cycloalkylalkyl or aryl;
X independently represents oxygen or $NR_2$, where $R_2$ independently represents hydrogen atom, alkyl, cycloalkyl, cycloalkylalkyl or aryl;
$R_3$ independently represents alkyl, cycloalkyl, cycloalkylalkyl or aryl; and
m is independently an integer of 2 to 50.

According to an embodiment of the present invention, the polyester block having a structure represented by the above chemical formula 1 may be derived from an ester oligomer prepared by condensation reaction of a compound represented by the following chemical formula 2-1 and a compound represented by the following chemical formula 2-2:

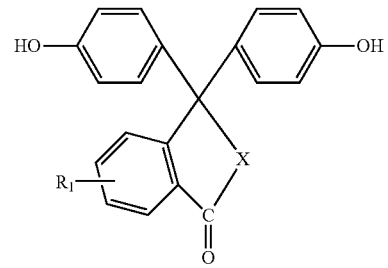

[Chemical formula 2-1]

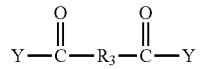

[Chemical formula 2-2]

In the above chemical formulas 2-1 and 2-2,
$R_1$ independently represents hydrogen atom, alkyl having 1 to 4 carbons, cycloalkyl having 3 to 6 carbons, cycloalkylalkyl having 4 to 10 carbons or aryl having 6 to 10 carbons;
X independently represents oxygen or $NR_2$, where $R_2$ independently represents hydrogen atom, alkyl having 1 to 4 carbons, cycloalkyl having 3 to 6 carbons, cycloalkylalkyl having 4 to 10 carbons or aryl having 6 to 10 carbons;
Y independently represents hydroxyl or halogen atom; and
$R_3$ independently represents alkyl having 1 to 10 carbons, cycloalkyl having 3 to 6 carbons, cycloalkylalkyl having 4 to 10 carbons or aryl having 6 to 10 carbons.

In another aspect, the present invention provides a method for preparing a polycarbonate block copolymer, comprising the steps of: (1) polymerizing an ester oligomer by condensation reaction of a compound represented by the above chemical formula 2-1 and a compound represented by the above chemical formula 2-2; and (2) copolymerizing the ester oligomer obtained in the above step (I) and polycarbonate in the presence of a polymerization catalyst.

In still another aspect, the present invention provides a molded article comprising the polycarbonate block copolymer.

Effect of the Invention

The polycarbonate block copolymer according to the present invention has remarkably improved heat resistance and also has good balance of properties such as transparency, impact strength, flowability, etc., and thus it can be usefully applied in products requiring heat resistance such as housing of office devices and electric/electronic products, automotive interior/exterior parts, etc.

CONCRETE MODE FOR CARRYING OUT THE INVENTION

The present invention is explained in more detail below.

(A) Polyester Block

The polycarbonate block copolymer of the present invention comprises, as repeating units, a polyester block having a structure represented by the following chemical formula 1:

[Chemical formula 1]

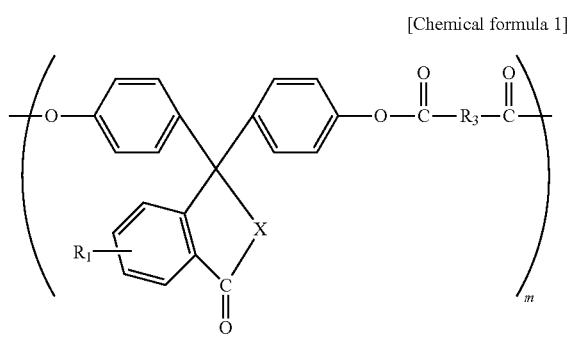

In the above chemical formula 1, $R_1$ independently represents hydrogen atom, alkyl, cycloalkyl, cycloalkylalkyl or aryl, and more concretely, $R_1$ represents hydrogen atom, alkyl having 1 to 4 carbons, cycloalkyl having 3 to 6 carbons, cycloalkylalkyl having 4 to 10 carbons, or aryl having 6 to 10 carbons;

X independently represents oxygen or $NR_2$, where $R_2$ independently represents hydrogen atom, alkyl, cycloalkyl, cycloalkylalkyl or aryl, and more concretely, $R_2$ represents hydrogen atom, alkyl having 1 to 4 carbons, cycloalkyl having 3 to 6 carbons, cycloalkylalkyl having 4 to 10 carbons, or aryl having 6 to 10 carbons;

$R_3$ independently represents alkyl, cycloalkyl, cycloalkylalkyl or aryl, and more concretely, $R_3$ represents alkyl having 1 to 10 carbons, cycloalkyl having 3 to 6 carbons, cycloalkylalkyl having 4 to 10 carbons, or aryl having 6 to 10 carbons; and m is independently an integer of 2 to 50, more concretely, an integer of 3 to 30, and still more concretely, an integer of 5 to 20.

According to an embodiment of the present invention, the polyester block having a structure represented by the above chemical formula 1 may be derived from an ester oligomer prepared by condensation reaction of a compound represented by the following chemical formula 2-1 and a compound represented by the following chemical formula 2-2:

[Chemical formula 2-1]

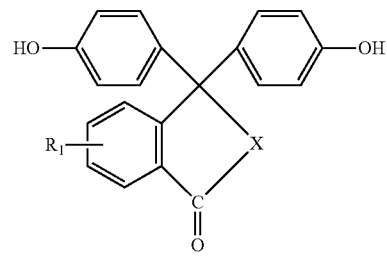

[Chemical formula 2-2]

In the above chemical formulas 2-1 and 2-2, $R_1$ independently represents hydrogen atom, alkyl having 1 to 4 carbons, cycloalkyl having 3 to 6 carbons, cycloalkylalkyl having 4 to 10 carbons or aryl having 6 to 10 carbons, and more concretely, $R_1$ represents hydrogen atom, alkyl having 1 to 3 carbons, cycloalkyl having 5 to 6 carbons, cycloalkylalkyl having 6 to 9 carbons, or aryl having 6 carbons;

X independently represents oxygen or $NR_2$, where $R_2$ independently represents hydrogen atom, alkyl having 1 to 4 carbons, cycloalkyl having 3 to 6 carbons, cycloalkylalkyl having 4 to 10 carbons or aryl having 6 to 10 carbons, and more concretely, $R_2$ represents hydrogen atom, alkyl having 1 to 3 carbons, cycloalkyl having 5 to 6 carbons, cycloalkylalkyl having 6 to 9 carbons, or aryl having 6 carbons;

Y independently represents hydroxyl or halogen atom (for example, chlorine atom); and $R_3$ independently represents alkyl having 1 to 10 carbons, cycloalkyl having 3 to 6 carbons, cycloalkylalkyl having 4 to 10 carbons or aryl having 6 to 10 carbons, and more concretely, $R_3$ represents alkyl having 1 to 6 carbons, cycloalkyl having 5 to 6 carbons, cycloalkylalkyl having 6 to 9 carbons, or aryl having 6 carbons.

The reaction molar ratio of a compound of the above chemical formula 2-1 to a compound of the above chemical formula 2-2 may be, for example, 1:0.5 to 1:2, and more concretely 1:0.6 to 1:1.5, but it is not limited thereto.

The above ester oligomer may have a number average molecular weight of 500 to 20,000 g/mol measured by GPC (gel permeation chromatography), but it is not limited thereto.

(B) Polycarbonate Block

The polycarbonate block contained in the polycarbonate block copolymer of the present invention as repeating units may be incorporated into the copolymer of the present invention by reacting a polycarbonate oligomer with the above ester oligomer.

There is no special limitation to the method for preparing the polycarbonate oligomer. For example, it may be prepared by a phosgene method mixing a dihydric phenol compound and phosgene together, but it is not limited thereto.

The dihydric phenol compound used in the polycarbonate oligomer preparation may be, for example, a compound of the following chemical formula 3:

[Chemical formula 3]

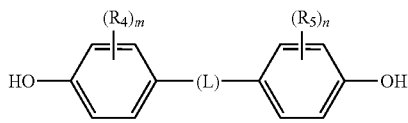

In the above chemical formula 3, L may represent a linear, branched or cyclic alkylene group having no functional group, or a linear, branched or cyclic alkylene group comprising a functional group such as sulfide, ether, sulfoxide, sulfone, ketone, phenyl, isobutylphenyl or naphthyl, and preferably, L may be a linear, branched or cyclic alkylene group having 1 to 10 carbons; each of $R_4$ and $R_5$ may independently represent halogen atom, or linear, branched or cyclic alkyl group; and m and n may independently represent an integer of 0 to 4.

The compound of the above chemical formula 3 may be, for example, bis(4-hydroxyphenyl)methane, bis(4-hydroxyphenyl)phenylmethane, bis(4-hydroxyphenyl)naphthylmethane, bis(4-hydroxyphenyl)-(4-isobutylphenyl)methane, 1,1-bis(4-hydroxyphenyl)ethane, 1-ethyl-1,1-bis(4-hydroxyphenyl)propane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 1,10-bis(4-hydroxyphenyl)decane, 2-methyl-1,1-bis(4-hydroxyphenyl)propane, 2,2-bis(4-hydroxyphenyl)propane, 2,2-bis(4-hydroxyphenyl)butane, 2,2-bis(4-hydroxyphenyl)pentane, 2,2-bis(4-hydroxyphenyl)hexane, 2,2-bis(4-hydroxyphenyl)nonane, 2,2-bis(3-methyl-4-hydroxyphenyl)propane, 2,2-bis(3-fluoro-4-hydroxyphenyl)propane, 4-methyl-2,2-bis(4-hydroxyphenyl)pentane, 4,4-bis(4-hydroxyphenyl)heptane, diphenyl-bis(4-hydroxyphenyl)methane, resorcinol, hydroquinone, 4,4'-dihydroxyphenyl ether[bis(4-hydroxyphenyl) ether], 4,4'-dihydroxy-2,5-dihydroxydiphenyl ether, 4,4'-dihydroxy-3,3'-dichlorodiphenyl ether, bis(3,5-dimethyl-4-hydroxyphenyl)ether, bis(3,5-dichloro-4-hydroxyphenyl) ether, 1,4-dihydroxy-2,5-dichlorobenzene, 1,4-dihydroxy-3-methylbenzene, 4,4'-dihydroxydiphenol[p,p'-dihydroxyphenyl], 3,3'-dichloro-4,4'-dihydroxyphenyl, 1,1-bis(4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3,5-dimethyl-4-hydroxyphenyl)cyclododecane, 1,1-bis(4-hydroxyphenyl)cyclododecane, 1,1-bis(4-hydroxyphenyl)butane, 1,1-bis(4-hydroxyphenyl)decane, 1,4-bis(4-hydroxyphenyl)propane, 1,4-bis(4-hydroxyphenyl)butane, 1,4-bis(4-hydroxyphenyl)isobutane, 2,2-bis(4-hydroxyphenyl)butane, 2,2-bis(3-chloro-4-hydroxyphenyl)propane, bis(3,5-dimethyl-4-hydroxyphenyl)methane, bis(3,5-dichloro-4-hydroxyphenyl)methane, 2,2-bis(3,5-dimethyl-4-hydroxyphenyl)propane, 2,2-bis(3,5-dibromo-4-hydroxyphenyl)propane, 2,2-bis(3,5-dichloro-4-hydroxyphenyl)propane, 2,4-bis(4-hydroxyphenyl)-2-methyl-butane, 4,4'-thiodiphenol[bis(4-hydroxyphenyl)sulfone], bis(3,5-dimethyl-4-hydroxyphenyl)sulfone, bis(3-chloro-4-hydroxyphenyl)sulfone, bis(4-hydroxyphenyl)sulfide, bis(4-hydroxyphenyl)sulfoxide, bis(3-methyl-4-hydroxyphenyl)sulfide, bis(3,5-dimethyl-4-hydroxyphenyl) sulfide, bis(3,5-dibromo-4-hydroxyphenyl)sulfoxide, 4,4'-dihydroxybenzophenone, 3,3',5,5'-tetramethyl-4,4'-dihydroxybenzophenone, 4,4'-dihydroxy diphenyl, methylhydroquinone, 1,5-dihydroxynaphthalene, or 2,6-dihydroxynaphthalene, but it is not limited thereto. Among them, the representative one is 2,2-bis(4-hydroxyphenyl)propane (bisphenol A). For other functional dihydric phenols, U.S. Pat. Nos. 2,999,835, 3,028,365, 3,153,008, 3,334,154 and 4,131,575, etc. may be referred to. The above dihydric phenol may be used alone or in combination of two or more of them.

According to an embodiment of the present invention, the oligomeric polycarbonate may be prepared by adding the above-explained dihydric phenol compound (for example, bisphenol A) in an aqueous alkaline solution, and then mixing and reacting the resulting mixture with an organic solvent (for example, dichloromethane) containing injected phosgene gas. At this time, the molar ratio of phosgene: dihydric phenol compound may be maintained within a range of about 1:1 to 1.5:1, and preferably, 1:1 to 1.2:1, and the prepared oligomeric polycarbonate may have a molecular weight of 1,000 to 2,000.

According to another embodiment of the present invention, the oligomeric polycarbonate may be formed by adding the above-explained dihydric phenol compound (for example, bisphenol A) in an aqueous alkaline solution, then mixing and reacting the resulting mixture with an organic solvent (for example, dichloromethane) containing injected phosgene gas (at this time, the molar ratio of phosgene: dihydric phenol compound may be maintained within a range of about 1:1 to 1.5:1, and preferably, 1:1 to 1.2:1), and stepwise adding thereto a molecular weight-controlling agent and a catalyst.

The reaction for forming the polycarbonate oligomer may generally be conducted at a temperature range of about 15 to 60° C. In order to adjust the pH of the reaction mixture, alkali metal hydroxide may be incorporated into the reaction mixture. The alkali metal hydroxide may be, for example, sodium hydroxide.

As the molecular weight-controlling agent, a monofunctional compound similar to a monomer used in preparation of polycarbonate may be used. The monofunctional compound may be, for example, a derivative based on phenol such as p-isopropylphenol, p-tert-butylphenol (PTBP), p-cumylphenol, p-isooctylphenol and p-isononylphenol, or an aliphatic alcohol. Preferably, p-tert-butylphenol (PTBP) may be used.

As the catalyst, a polymerization catalyst and/or a phase transfer catalyst may be used. The polymerization catalyst may be, for example, triethylamine (TEA), and the phase transfer catalyst may be a compound of the following chemical formula 4:

$(R_6)_4Q^+Z^-$  [Chemical formula 4]

In the above chemical formula 4, $R_6$ may represent alkyl group having 1 to 10 carbons; Q may represent nitrogen or phosphorus; and Z may represent halogen atom or —$OR_7$, wherein $R_7$ represents hydrogen atom, alkyl group having 1 to 18 carbons or aryl group having 6 to 18 carbons.

The phase transfer catalyst may be, for example, [$CH_3(CH_2)_3]_4NZ$, [$CH_3(CH_2)_3]_4PZ$, [$CH_3(CH_2)_5]_4NZ$, [$CH_3(CH_2)_6]_4NZ$, [$CH_3(CH_2)_4]_4NZ$, $CH_3[CH_3(CH_2)_3]_3NZ$ or $CH_3[CH_3(CH_2)_2]_3NZ$, wherein Z may be Cl, Br or —$OR_7$ where $R_7$ may be hydrogen atom, alkyl group having 1 to 18 carbons or aryl group having 6 to 18 carbons.

The amount of the phase transfer catalyst is preferably about 0.1 to 10% by weight of the reaction mixture. If the amount of the phase transfer catalyst is less than 0.1% by weight, the reactivity may be lowered, and if its amount is greater than 10% by weight, the phase transfer catalyst may be precipitated and the transparency of the resulting copolymer may deteriorate.

In an embodiment, after the polycarbonate oligomer is formed as the above, the organic phase dispersed in methylene chloride is washed with alkali and then separated. Subsequently, the organic phase is washed with 0.1 N solution of hydrochloric acid and then rinsed with distilled water 2 or 3 times.

After the rinsing is completed, the concentration of the organic phase dispersed in methylene chloride is adjusted constantly and granulation is conducted by using a constant amount of double-distilled water at a temperature ranging from 40 to 80° C. If the temperature of the double-distilled water is lower than 40° C., the granulation rate is low and thus the granulation time may be too long. If the temperature of the double-distilled water is higher than 80° C., it may be difficult to obtain the polycarbonate in uniformly sized morphology. After the granulation is completed, it is preferable to dry the product at 100 to 110° C. for 5 to 10 hours first, and then at 110 to 120° C. for 5 to 10 hours.

The prepared polycarbonate oligomer may have a viscosity average molecular weight of 1,000 to 20,000, and more preferably 1,000 to 15,000. If the viscosity average molecular weight is less than 1,000, the mechanical properties may deteriorate seriously, and if the viscosity average molecular weight is greater than 20,000, there may be a problem of lowered reactivity of copolymerization.

(C) Block Copolymer

The block copolymer of the present invention comprises, as repeating units, (A) a polyester block having a structure represented by the above-explained chemical formula 1 and (B) a polycarbonate block.

The polycarbonate block (B) includes a linear polycarbonate block, a branched polycarbonate block, and a combination thereof together. According to an embodiment of the present invention, a linear polycarbonate block is mainly used, but a branched polycarbonate block may be used and both of them may be used in combination.

The amount of the polyester block (A) having a structure represented by chemical formula 1 is preferably 0.5 to 50 mol %, based on the total moles of the monomer compounds constituting the copolymer as 100 mol %. If the relative amount of the polyester block having a structure represented by chemical formula 1 in the copolymer is less than this range, heat resistance may be lowered. In contrast, if the relative amount is greater than this range, properties such as transparency, flowability, impact strength, etc. may be lowered and the production cost may increase.

The block copolymer of the present invention preferably has a viscosity average molecular weight (Mv) of 10,000 to 200,000, more preferably 10,000 to 150,000, and still more preferably 15,000 to 700,000, when measured in a methylene chloride solution. If the viscosity average molecular weight of the copolymer is less than 10,000, the mechanical properties may deteriorate seriously, and if the viscosity average molecular weight is greater than 200,000, there may be a problem in the processing of resin due to the increase of melting viscosity.

The block copolymer of the present invention may be prepared by preparing a polycarbonate oligomer as above, and then copolymerizing the prepared polycarbonate oligomer and the above-explained ester oligomer.

Therefore, according to another aspect of the present invention, a method for preparing a polycarbonate block copolymer, comprising the steps of: (I) polymerizing an ester oligomer by condensation reaction of a compound represented by the above chemical formula 2-1 and a compound represented by the above chemical formula 2-2; and (2) copolymerizing the ester oligomer obtained in the above step (I) and polycarbonate in the presence of a polymerization catalyst, is provided.

As the polymerization catalyst, for example, a basic catalyst such as alkali metal hydroxide, alkylammonium salt, alkylamine, etc. may be used.

According to an embodiment of the present invention, the block copolymer of the present invention may be prepared by adding the ester oligomer to a mixture of organic phase-aqueous phase containing the already prepared polycarbonate oligomer, and stepwise adding thereto a molecular weight-controlling agent and a catalyst. The molecular weight-controlling agent and the catalyst are explained above.

In addition, according to an embodiment, the organic phase containing the prepared copolymer dispersed in methylene chloride is washed with alkali and then separated, the organic phase is subsequently washed with 0.1 N solution of hydrochloric acid and then rinsed with distilled water 2 or 3 times, and after the rinsing is completed, the concentration of the organic phase dispersed in methylene chloride is adjusted constantly and granulation is conducted by using a constant amount of pure water at a temperature ranging from 40 to 80° C. If the temperature of the pure water is lower than 40° C., the granulation rate is low and thus the granulation time may be too long. If the temperature of the pure water is higher than 80° C., it may be difficult to obtain the copolymer in uniformly sized morphology. After the granulation is completed, it is preferable to dry the product at 100 to 110° C. for 5 to 10 hours first, and then at 110 to 120° C. for 5 to 10 hours.

The block copolymer according to the present invention has remarkably improved heat resistance, and at the same time, it also has good balance of properties such as transparency, impact strength, flowability, etc., and thus it can be usefully applied in products requiring heat resistance such as optical materials, automotive parts (interior/exterior parts), housing of office devices and electric/electronic products, etc.

Therefore, according to another aspect of the present invention, a molded article comprising the polycarbonate block copolymer of the present invention is provided.

There is no special limitation in a method for producing a molded article by processing the polycarbonate block copolymer of the present invention, and the molded article can be produced by using a method generally used in the field of plastic molding.

The present invention is explained in more detail through the following Examples and Comparative Examples. However, the scope of the present invention is not limited thereby in any manner.

EXAMPLES

Preparation Example 1: Preparation of Ester Oligomer of Chemical Formula 7

In a 500 mL three-necked flask, phenolphthaleine of chemical formula 5 (30 mmol), terephthaloyl chloride of chemical formula 6 (20 mmol) and 200 mL of tetrahydrofuran were added, and 20 g of triethylamine (TEA) was slowly added thereto under nitrogen atmosphere at 25° C., and the resulting mixture was agitated for 12 hours. The generated precipitate was washed with distilled water and methanol, and dried in a vacuum oven for 24 hours to obtain 13.4 g of the ester oligomer of chemical formula 7.

[Chemical formula 5]

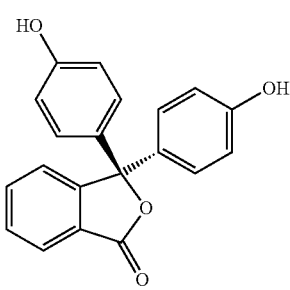

[Chemical formula 6]

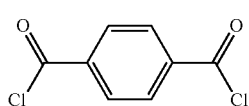

[Chemical formula 7]

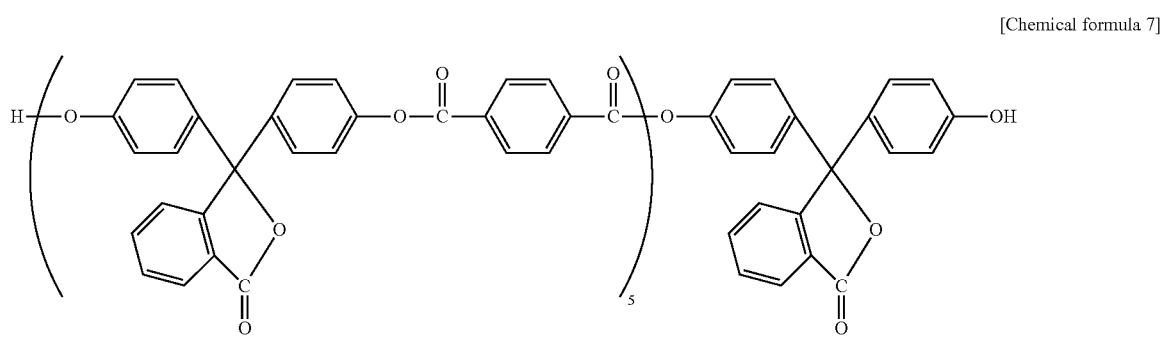

Preparation Example 2: Preparation of Ester Oligomer of Chemical Formula 8

In a 500 mL three-necked flask, phenolphthaleine of chemical formula 5 (30 mmol), terephthaloyl chloride of chemical formula 6 (25 mmol) and 200 mL of tetrahydrofuran were added, and 20 g of triethylamine (TEA) was slowly added thereto under nitrogen atmosphere at 25° C., and the resulting mixture was agitated for 24 hours. The generated precipitate was washed with distilled water and methanol, and dried in a vacuum oven for 24 hours to obtain 12.5 g of the ester oligomer of chemical formula 8.

Preparation Example 3: Preparation of Ester Oligomer of Chemical Formula 10

In a 500 mL three-necked flask, 3,3-bis (4-hydroxyphenyl) phthalimidine (BHPP) of chemical formula 9 (30 mmol), terephthaloyl chloride of chemical formula 6 (20 mmol) and 200 mL of tetrahydrofuran were added, and 20 g of triethylamine (TEA) was slowly added thereto under nitrogen atmosphere at 25° C., and the resulting mixture was agitated for 12 hours. The generated precipitate was washed with distilled water and methanol, and dried in a vacuum oven for 24 hours to obtain 13.2 g of the ester oligomer of chemical formula 10.

[Chemical formula 8]

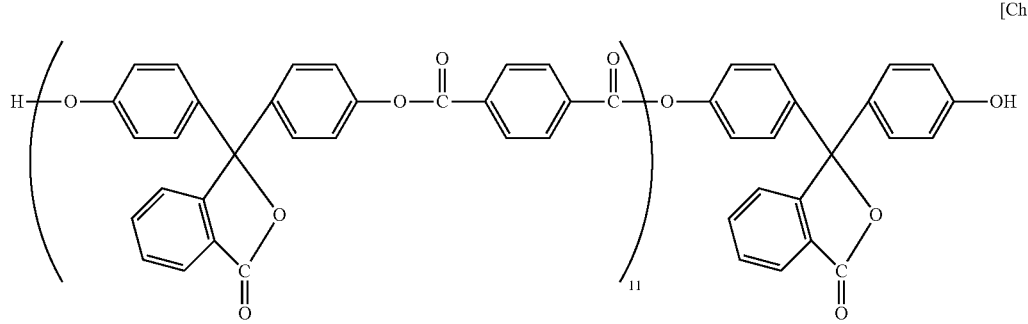

[Chemical formula 9]

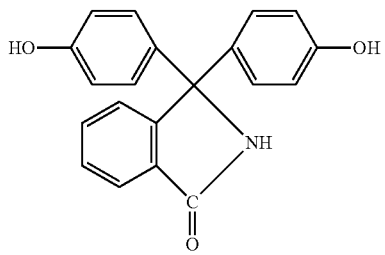

[Chemical formula 10]

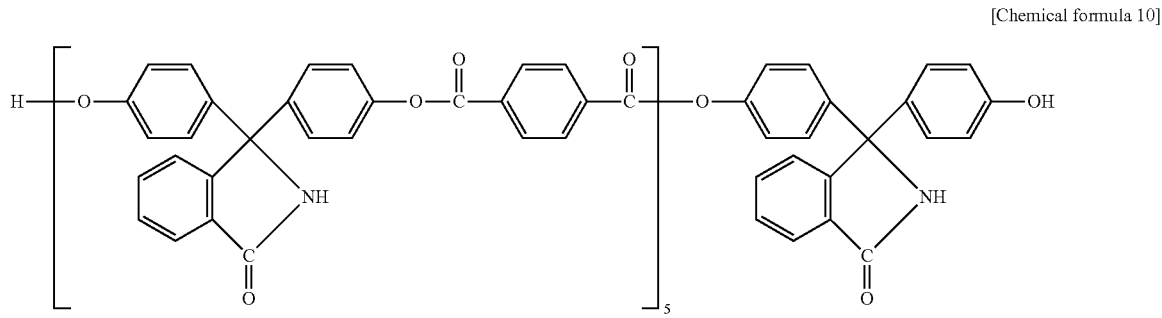

Preparation Example 4: Preparation of Ester Oligomer of Chemical Formula 12

In a 500 mL three-necked flask, N-phenyl 3,3-bis(4-hydroxyphenyl)phthalimidine (PBHPP) of chemical formula 11 (30 mmol), terephthaloyl chloride of chemical formula 6 (20 mmol) and 200 mL of tetrahydrofuran were added, and 20 g of triethylamine (TEA) was slowly added thereto under nitrogen atmosphere at 25° C., and the resulting mixture was agitated for 12 hours. The generated precipitate was washed with distilled water and methanol, and dried in a vacuum oven for 24 hours to obtain 13.8 g of the ester oligomer of chemical formula 12.

Preparation Example 5: Preparation of Polycarbonate Oligomer

In a 1 L three-necked flask, 60 g (0.263 mol) of bisphenol A was dissolved in 330 ml of 5.6 wt % aqueous solution of sodium hydroxide (18.46 g, 0.462 mol), and 26.0 g (0.263 mol) of phosgene trapped in methylene chloride was slowly added thereto through teflon tube (20 mm) and reacted. The outside temperature was maintained at 0° C. The reactants, which passed through the tubular reactor, were interfacially reacted under a nitrogen environment for about 10 minutes to prepare an oligomeric polycarbonate having a viscosity average molecular weight of about 1,000. From the mixture

[Chemical formula 11]

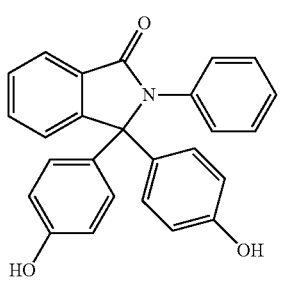

[Chemical formula 12]

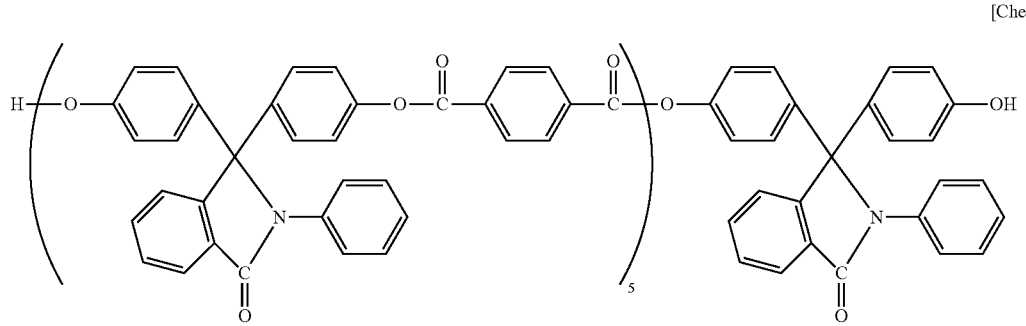

containing the prepared oligomeric polycarbonate, 215 mL of organic phase and 322 mL of aqueous phase were collected and mixed with 1.383 g of p-tert-butylphenol (PTBP) (9.21 mmol, 3.5 mol % to bisphenol A), 0.731 g of tetrabutyl ammonium chloride (TBACl) (2.63 mmol, 1 mol % to bisphenol A) and 0.1 mL of 15 wt % aqueous solution of tri-ethylamine (TEA), and reacted for 30 minutes to prepare a polycarbonate oligomer solution.

Preparation Example 6: Preparation of Polycarbonate Oligomer

In a 1 L three-necked flask, 60 g (0.263 mol) of bisphenol A was dissolved in 330 ml of 5.6 wt % aqueous solution of sodium hydroxide (18.46 g, 0.462 mol), and 26.0 g (0.263 mol) of phosgene trapped in methylene chloride was slowly added thereto through teflon tube (20 mm) and reacted. The outside temperature was maintained at 0° C. The reactants, which passed through the tubular reactor, were interfacially reacted under a nitrogen environment for about 10 minutes to prepare an oligomeric polycarbonate having a viscosity average molecular weight of about 1,000. From the mixture containing the prepared oligomeric polycarbonate, 215 mL of organic phase and 322 mL of aqueous phase were collected and mixed with 0.198 g of p-tert-butylphenol (PTBP) (1.32 mmol, 0.5 mol % to bisphenol A), 0.731 g of tetrabutyl ammonium chloride (TBACl) (2.63 mmol, 1 mol % to bisphenol A) and 0.1 mL of 15 wt % aqueous solution of tri-ethylamine (TEA), and reacted for 30 minutes to prepare a polycarbonate oligomer solution.

Example 1: Preparation of Block Copolymer

To the polycarbonate oligomer solution prepared in the above Preparation Example 5, 15 g of the compound of the above chemical formula 7 was added. After the phases were separated, only the organic phase was collected and thereto, 283 g of methylene chloride which was the same amount of the organic phase, 110 mL of 1.1 N aqueous solution of sodium hydroxide (20 vol % to the total mixture) and 15 μL of 15 wt % triethylamine were admixed and reacted for 1 hour, and then 167 μL of 15 wt % triethylamine and 128 g of methylene chloride were further added thereto and reacted for additional 1 hour. After phase separation, pure water was added to the viscosity-increased organic phase, and it was washed with alkali and separated. Subsequently, the resulting organic phase was washed with 0.1 N hydrochloric acid solution and then rinsed with distilled water 2 or 3 times repeatedly. After the rinse was completed, the concentration of the organic phase was adjusted constantly and then granulated by using a constant amount of double-distilled water at 76° C. After the granulation was completed, the product was dried first at 110° C. for 8 hours and then at 120° C. for 10 hours to prepare a block copolymer. The properties of the prepared copolymer were measured, and the results are shown in the following Table 1.

Example 2: Preparation of Block Copolymer

Excepting that 75 g of the compound of chemical formula 7 was used, a block copolymer was prepared by the same method as Example 1. The properties of the prepared copolymer were measured, and the results are shown in the following Table 1.

Example 3: Preparation of Block Copolymer

Excepting that 30 g of the compound of chemical formula 8 was used instead of the compound of chemical formula 7, a block copolymer was prepared by the same method as Example 1. The properties of the prepared copolymer were measured, and the results are shown in the following Table 1.

Example 4: Preparation of Block Copolymer

Excepting that 15 g of the compound of chemical formula 10 was used instead of the compound of chemical formula 7, a block copolymer was prepared by the same method as Example 1. The properties of the prepared copolymer were measured, and the results are shown in the following Table 1.

Example 5: Preparation of Block Copolymer

Excepting that 17 g of the compound of chemical formula 12 was used instead of the compound of chemical formula 7, a block copolymer was prepared by the same method as Example 1. The properties of the prepared copolymer were measured, and the results are shown in the following Table 1.

Example 6: Preparation of Block Copolymer

Excepting that the polycarbonate oligomer solution prepared in the above Preparation Example 6 was used instead of the polycarbonate oligomer solution prepared in the above Preparation Example 5, a block copolymer was prepared by the same method as Example 1. The properties of the prepared copolymer were measured, and the results are shown in the following Table 1.

Comparative Example 1

A linear polycarbonate having a viscosity average molecular weight of 21,200 was prepared by a polymerization method using interfacial reaction. The properties of the prepared linear polycarbonate were measured, and the results are shown in the following Table 1.

Comparative Example 2

A linear polycarbonate having a viscosity average molecular weight of 71,200 was prepared by a polymerization method using interfacial reaction. The properties of the prepared linear polycarbonate were measured, and the results are shown in the following Table 1.

The values of properties shown in the following Table 1 are those measured after drying the resins prepared in the above Examples and Comparative Examples at 120° C. for 24 hours. The methods of property measurement were as follows.

(1) Viscosity average molecular weight: The viscosity of methylene chloride solution was measured by using an Ubbelohde Viscometer at 20° C., and the limiting viscosity [η] was calculated therefrom according to the following equation.

$$[\eta]=1.23\times10^{-5}M_v^{0.83}$$

(2) Impact strength: The impact strength was measured by using an impact tester (RESIL IMPACTOR, CEAST) at room temperature.

(3) Total transmittance: The total transmittance was measured in accordance with ASTM D1003 using a 3 mm-thick test specimen.

(4) Glass transition temperature: The glass transition temperature was measured by using a differential scanning calorimeter (DSC-7 & Robotic, Perkin-Elmer).

TABLE 1

| Properties | Examples | | | | | | Comparative Examples | |
| --- | --- | --- | --- | --- | --- | --- | --- | --- |
|  | 1 | 2 | 3 | 4 | 5 | 6 | 1 | 2 |
| Molecular weight (Mv) | 21,100 | 21,300 | 21,300 | 21,200 | 21,000 | 71,000 | 21,200 | 71,100 |
| Impact strength (Kg$_f$cm/cm$^2$) | 75 | 71 | 76 | 73 | 72 | 80 | 79 | 84 |
| Total transmittance (%) | 89 | 87 | 87 | 87 | 88 | 88 | 89 | 88 |
| Glass transition temperature (° C.) | 185 | 222 | 211 | 217 | 229 | 188 | 150 | 152 |

As can be seen from the above Table 1, as compared with the polycarbonates of Comparative Examples, the polycarbonate block copolymers prepared in Examples 1 to 6 according to the present invention showed remarkably superior heat resistance, maintaining impact resistance and transparency at similar levels.

The invention claimed is:

1. A polycarbonate block copolymer consisting of, as repeating units, (A) a polyester block having a structure represented by the following chemical formula 1; and (B) a polycarbonate block derived from a polycarbonate oligomer prepared from a dihydric phenol compound and phosgene:

[Chemical formula 1]

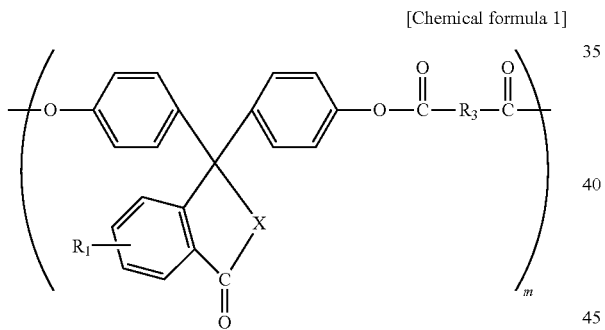

wherein, in the above chemical formula 1,
R$_1$ independently represents hydrogen atom;
X independently represents oxygen or NR$_2$, where R$_2$ independently represents hydrogen atom or aryl;
R$_3$ independently represents aryl; and
m is independently an integer of 5 to 11,
wherein the dihydric phenol compound is a compound of the following chemical formula 3:

[Chemical formula 3]

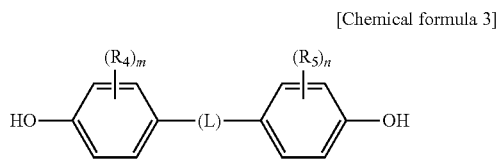

wherein, in the above chemical formula 3, L is a linear, branched or cyclic alkylene group having 1 to 10 carbons; each of R$_4$ and R$_5$ independently represents halogen atom, or linear, branched or cyclic alkyl group; and m and n independently represent an integer of 0 to 4;

wherein the amount of the polyester block (A) having a structure represented by chemical formula 1 is 0.5 to 50 mol %, based on the total moles of the monomer compounds constituting the copolymer as 100 mol %, wherein the polycarbonate block copolymer has a viscosity average molecular weight (Mv) of 21,000 to 71,000, wherein the polycarbonate block copolymer has an impact strength of 71-80 Kg$_f$cm/cm$^2$, and wherein the polycarbonate block copolymer has a glass transition temperature of above 185° C. and up to 229° C. and wherein the polycarbonate block copolymer has a glass transition temperature of above 152° C. and up to 211° C.

2. The polycarbonate block copolymer of claim 1, wherein the polyester block having a structure represented by chemical formula 1 is derived from an ester oligomer prepared by condensation reaction of a compound represented by the following chemical formula 2-1 and a compound represented by the following chemical formula 2-2:

[Chemical formula 2-1]

[Chemical formula 2-2]

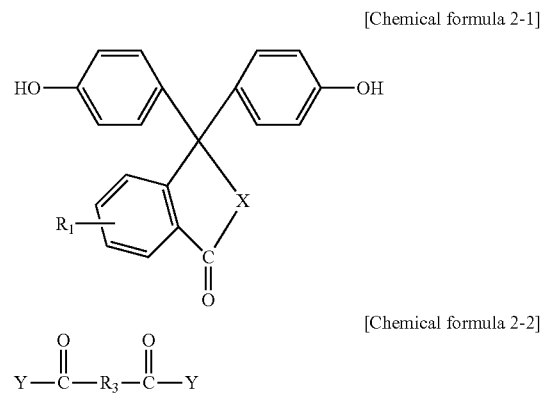

wherein, in the above chemical formulas 2-1 and 2-2,
R$_1$ independently represents hydrogen atom;
X independently represents oxygen or NR$_2$, where R$_2$ independently represents hydrogen atom or aryl having 6 to 10 carbons;
Y independently represents hydroxyl or halogen atom; and
R$_3$ independently represents aryl having 6 to 10 carbons.

3. The polycarbonate block copolymer of claim 2, wherein the reaction molar ratio of a compound of chemical formula 2-1 to a compound of chemical formula 2-2 is 1:0.5 to 1:2.

4. The polycarbonate block copolymer of claim 2, wherein the ester oligomer has a number average molecular weight of 500 to 20,000 g/mol.

5. The polycarbonate block copolymer of claim 1, wherein the dihydric phenol compound is bisphenol A.

6. The polycarbonate block copolymer of claim 1, wherein the polycarbonate oligomer has a viscosity average molecular weight of 1,000 to 20,000.

7. A method for preparing a polycarbonate block copolymer of claim 1, comprising the steps of:
(1) polymerizing an ester oligomer by condensation reaction of a compound represented by the following chemical formula 2-1 and a compound represented by the following chemical formula 2-2; and
(2) copolymerizing the ester oligomer obtained in the above step (1) and a polycarbonate oligomer prepared from a dihydric phenol compound and phosgene, in the presence of a polymerization catalyst:

[Chemical formula 2-1]

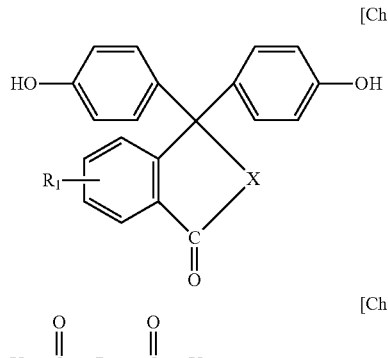

[Chemical formula 2-2]

Y—C(=O)—R₃—C(=O)—Y wherein, in the above chemical formulas 2-1 and 2-2,
$R_1$ independently represents hydrogen atom;
X independently represents oxygen or $NR_2$, where $R_2$ independently represents hydrogen atom or aryl having 6 to 10 carbons;
Y independently represents hydroxyl or halogen atom; and
$R_3$ independently represents aryl having 6 to 10 carbons, wherein the dihydric phenol compound is a compound of the following chemical formula 3:

[Chemical formula 3]

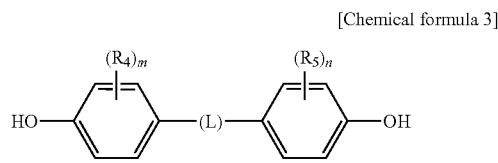

wherein, in the above chemical formula 3, L is a linear, branched or cyclic alkylene group having 1 to 10 carbons; each of $R_4$ and $R_5$ independently represents halogen atom, or linear, branched or cyclic alkyl group; and m and n independently represent an integer of 0 to 4;

wherein the amount of the polyester block (A) having a structure represented by chemical formula 1 is 0.5 to 50 mol %, based on the total moles of the monomer compounds constituting the copolymer as 100 mol %, wherein the polycarbonate block copolymer has a viscosity average molecular weight (Mv) of 21,000 to 71,000, wherein the polycarbonate block copolymer has an impact strength of 71-80 $Kg_f \cdot cm/cm^2$ and wherein the polycarbonate block copolymer has a glass transition temperature of above 185° C. and up to 229° C. and wherein the polycarbonate block copolymer has a glass transition temperature of above 152° C. and up to 211° C.

8. A molded article comprising the polycarbonate block copolymer of claim 1.

9. The molded article of claim 8, which is an optical material or an automotive part.

* * * * *